May 3, 1966  R. W. SMITH, JR  3,249,327
AIRFOIL STRUCTURE
Filed Dec. 2, 1963  2 Sheets-Sheet 1

INVENTOR

Russell W Smith Jr

May 3, 1966  R. W. SMITH, JR  3,249,327
AIRFOIL STRUCTURE
Filed Dec. 2, 1963  2 Sheets-Sheet 2

INVENTOR
Russell W Smith Jr

3,249,327
AIRFOIL STRUCTURE
Russell W. Smith, Jr., 4606 S. 28 Road, Arlington, Va.
Filed Dec. 2, 1963, Ser. No. 327,204
12 Claims. (Cl. 244—123)

This invention relates to a structural system for those elements of aircraft generally referred to as airfoils, which when moved through the air, provides lift or other aerodynamic reaction. Such airfoil elements are employed in the wings and control surfaces of airplanes, missiles and rockets, dirigibles, and other related aircraft as replacement for sails on sailing craft and as hydrofoils.

In conventional airfoil construction, the main structural element is a spar that is cantilevered out from the fuselage and/or from the spar of another opposing wing. As the principal supporting element of a wing, the cantilevered spar must of necessity be extremely strong and relative massive at its base where its joins the fuselage, since leverage forces act upon it which are proportionate to the length and size of the supported wing. The strength requirements, and therefore the weight, of the cantilevered spar are sometimes reduced by struts and supporting lines external to the wing structure, but are not generally used because of the introduction of drag and consequent loss of aircraft efficiency.

Also, in conventional airfoil construction, those members such as the ribs, skin, etc., which impart desired aerodynamic contours and surfaces, are generally parasitic in that they increase the weight of the total structure more than their incorporation into truss like designs allows weight reduction of other elements.

The general object of my invention is to produce a minimum weight airfoil structural system which does not require the spar to be cantilevered, has a minimum number of component elements, combines all aerodynamic functions into essential structural elements thus eliminating all parasitic, non-structural members, has the strength and flexibility to absorb without permanent damage in-flight shock and deformation, lends itself to size configurations beyond the practical limits of the current state-of-the-art, and provides an improved lift to weight ratio.

An object of my invention is to adapt as the total airfoil structure, those elements, modified to perform useful aerodynamic function, found in the well known and highly efficient structural system which employs a central mast or spar, that need be only strong enough to resist compression stresses, positioned and held in place by guy lines affixed to its apex and strung under tension to anchors spaced at a sufficient distance from its base to provide angular support of the spar on at least three opposed sides. This familiar structural system provides maximum strength with minimum weight and has found application in such structures as radio and television towers, circus tents, the booms of power shovels and cranes, and the masts of sailing craft.

The adaptation of this system to function as an airfoil structure, and the modification of certain of its elements so that they perform aerodynamic functions, is achieved in my invention by using a plurality of guy lines anchored at sufficient distance from the spar to provide angular support for it, but in such manner that the anchor points of said guy lines also circumscribe an airfoil configuration, and said plurality of supporting guy lines, properly sized and spaced, form in combination a generally conical airfoil framework, which when covered with a suitable skin material, maintains its structure and shape in flight, and is aerodynamically useful. The desired airfoil configuration imposed on the plurality of guy lines at their base in this invention, is maintained by them at all their cross sectional points out to their convergence at the apex of the spar.

It should be understood that in my invention, it will be desirable in certain size configurations to make the skin material integral with actual guy lines or for the skin to replace these lines in function.

A further object of my invention is to achieve maximum strength characteristics and weight savings by combining two airfoils of the above construction into a single symmetrical structure in such arrangement that there is a cancellation of forces exerted by the elements of one airfoil on a common base by the equal but opposite forces exerted by the elements of the symmetrically opposite airfoil.

In my invention, spars are seated directly opposite each other on opposing sides of a common base, and corresponding tensioned lines are in effect continuous from the apex of one symmetrical spar to the apex of the other spar since they are each affixed to the same anchor point on the central airfoil shaped base element. Because of this equalization of static forces, the base member must be only strong enough to maintain the attached lines at the correct distances from the spar seatings so that said lines may provide angular support to the spars, and be maintained in the desired airfoil configuration.

Another object of my invention is to provide a semi-flexible airfoil structure that allows deforming stresses to be absorbed without breakage or bending, and that will return to its operative shape when such deforming forces are removed. The desired flexibility to yield with in-flight shock, bending, twisting, or other deforming forces, and to make recovery after their removal, is achieved in my invention by attaching the spars to the base in such manner that they are free to move, supporting them with tensioned lines that are inherently elastic, and by the use of a stretched skin of flexible material.

An additional object of my airfoil structure is to have all elements of my airfoil structure so interrelated and interdependent that shock or other forces applied to any one element is transmitted to, and absorbed by, all other elements in the structure. In my invention, this is achieved since the tensioned elements supporting and positioning a spar are in effect balanced against each other and are countered by the compression resistance of the spar, while both tension and compression elements of one airfoil are in turn balanced against and countered by corresponding elements of the other symmetrical airfoil. An externally caused change in the tension or compression condition of any one element upsets the equilibrium of the system and causes compensating tension or compression changes in all other elements.

My invention's maximum advantage will be derived, and its full potential realized, when the symmetrically opposed airfoil system is utilized as the principal structure of an all-wing type aircraft, with the only addition, suitable control surfaces. It will find advantage in, and is equally applicable to, very small or very large wingspreads in both heavier-than-air and lighter-than-air craft.

It is anticipated my invention will find application as the airfoils of large, relative slow, upper atmosphere or long endurance aircraft carrying bulky electronic or other apparatus, as permanent or expendable wings or launching platforms for rockets or space craft, on very light and low powered sport aircraft, and as the entire basic structure of very large lighter-than-air craft. The use of my invention in lighter-than-air craft will make practical the construction of airfoil shaped dirigible which will have the altitude and performance characteristics of heavier-than-air craft while retaining the lighter-than-air craft's utility, load carrying capacity, endurance capabilities, and the ability to hover, land and take-off without runways or airport facilities.

My invention will be best understood, also its additional objectives and advantages made apparent, from the following description and referenced drawings, in which.

Figure 1:
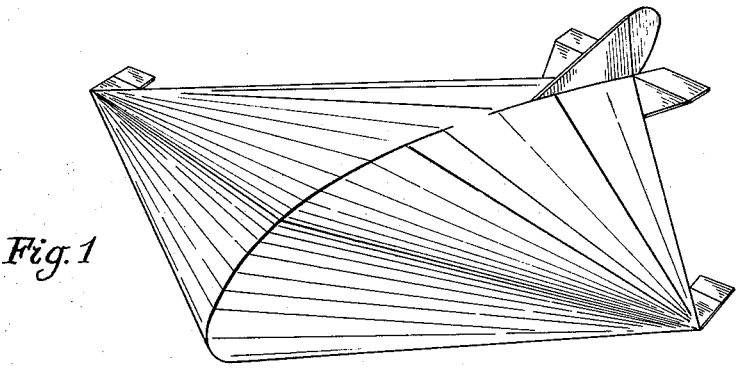
FIGURE 1 is a perspective view of a possible specific embodiment of my airfoils as an all wing aircraft with control surfaces added.
Figure 2:
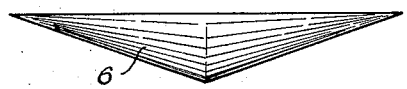
FIGURE 2 is a front view of the completed symmetrical airfoil structure.
Figure 2A:
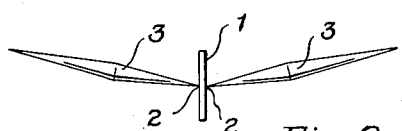
FIGURE 2a is the same front view with skin and supporting lines removed and shows the relationship of the base member and symmetrical spars.
Figure 3:
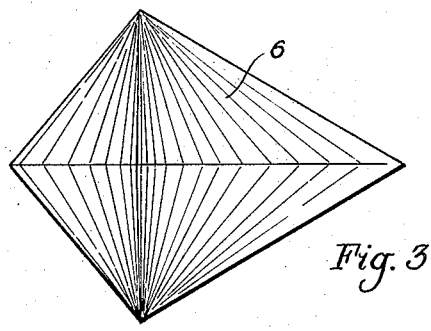
FIGURE 3 is a top view of the completed symmetrical airfoil structure.
Figure 4:
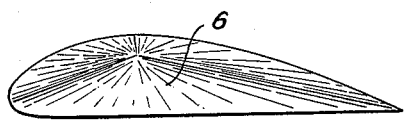
FIGURE 4 is a side view of the completed symmetrical airfoil structure.
Figure 4A:
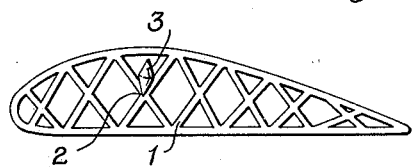
FIGURE 4a is the same side view with skin and supporting lines removed and shows the relationship of the base member and the symmetrical spars.
Figure 3A:
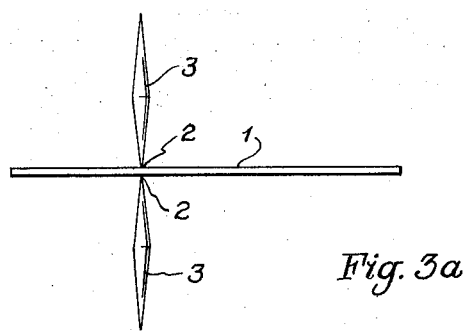
FIGURE 3a is the same top view with skin and supporting lines removed and shows the relationship of the base member and the symmetrical spars.
Figure 5:
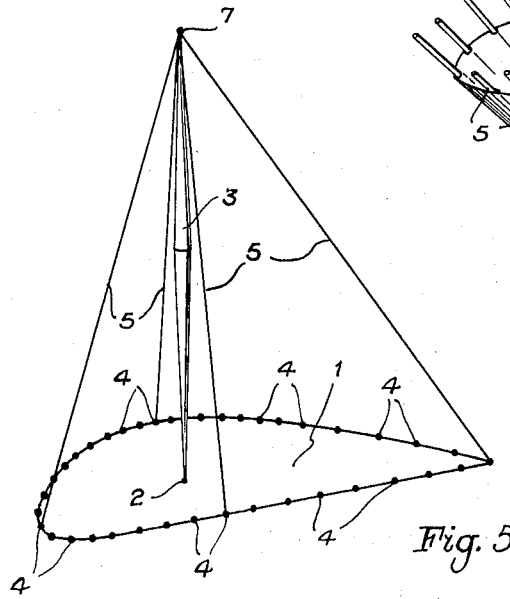
FIGURE 5 is a view of a single airfoil showing the spar and arrangement of anchor points on a base to impart an airfoil configuration to the guy lines. Only four of the plurality of lines is shown for clarity.
Figure 6:
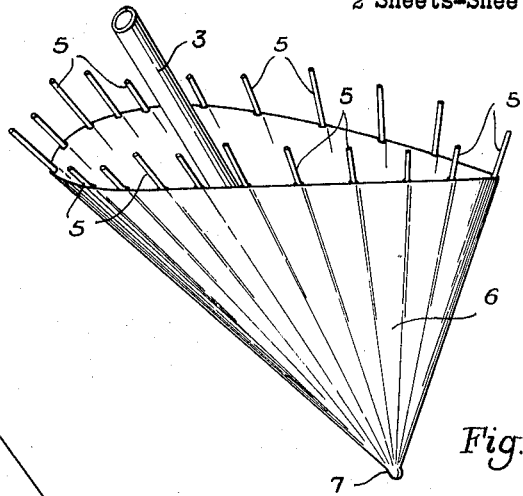
FIGURE 6 is a cut away perspective view of an airfoil tip showing how the tensioned guy lines maintain the skin material in the desired useful airfoil configuration at this cross section point.
Figure 7:
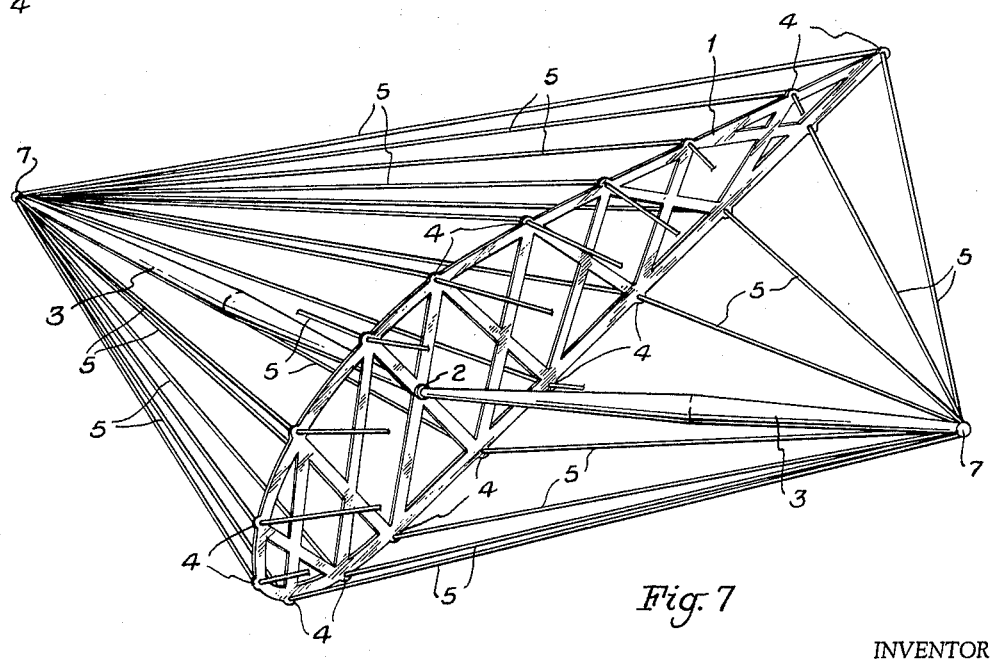
FIGURE 7 is a simplified perspective view of my symmetrical airfoil structure with the skin removed. Portions of some of the guy lines are deleted for clarity of the drawings.

Referring to the drawings, my invention consists of an airfoil shaped base member 1, which may be a separate structure or a part of a larger structure or an aircraft fuselage, compression resistant spars 3, tensioned guy lines 5 which also provide the airfoil framework of the structure, and a skin material 6.

The spar 3 is mounted on the airfoil shaped base 1 at a point 2 by a ball joint or other method which leaves it free to move when stresses are encountered. The mounting point 2 of the spar 3 is located approximately one third back from the leading edge of the airfoil shaped base 1 and approximately midway its vertical dimension.

At intervals around the perimeter of the airfoil shaped base 1 and at the apex 7 of the spar 3 are eyebolt or equivalent fittings serving as base anchor points 4 and apex anchor points 7. A plurality of tensioned guy lines 5 are stretched from each base anchor point 4 to the apex anchor point 7, said guy lines supporting and positioning the spar approximately perpendicular to the base and providing an airfoil shaped framework over which skin material 6 can be stretched. The actual angle the spars 3 are mounted in relation to the base 1 is determined by the desired dihedral and sweep back of a particular plane design.

In the application of my invention to produce a symmetrical airfoil structure, a single base 1 is common to both symmetrically opposed airfoils. Mounting points 2 for the opposed spars 3 are diametrically placed on opposite sides of the common base 1 and anchor points 4 on the airfoil shaped perimeter of the common base 1 are common to corresponding symmetrical guy lines 5 tensioned from the apexes 7 of both symmetrical spars 3.

The guy lines 5 are equally tensioned so that a completely symmetrical structure results. Tension forces exerted by any guy line 5 on the base anchor point 4 is countered by the equal forces exerted by its symmetrical counterpart and the compression forces exerted by a spar 3 on the base 1 is countered by equal forces exerted by the opposite symmetrical spar 3. Thus, the base 1 need only be a light weight airfoil shaped truss strong enough to resist deformation in its own plane and not designed to resist twisting or bending moments acting at right angles to it.

A skin material 6 is shaped to the airfoil shape of the framework provided by the guy lines 5 and stretched from the apex 7 of the spars 3 to the perimeter anchor points 4 of the airfoil shaped base 1, and is attached along the guy lines 5. Assuming sufficient tensile strength of the skin 6 when certain materials are used, guy lines 5 may be reduced in size or replaced entirely by the skin 6.

An extremely light weight airfoil structure of symmetrical structure elements results which has the forces acting from one symmetrical half balanced by those of the other, which has the flexibility to absorb sudden shock, and which transmits throughout the system unusual strains acting against any member.

I claim:

1. A bilaterally symmetrical airfoil structure comprising, in combination, a vertical airfoil shaped central member, a pair of generally horizontal compression members symmetrically attached at their base to the central member near its center of gravity, and tensioned members running from the apexes of the compression members to anchor points around the perimeter of the airfoil shaped central member, said tensioned members positioning and supporting the compression members at generally right angles to the central member and diametric to each other, said tensioned members being of sufficient number and so arranged that they impart to the structure an airfoil configuration, serving as a skeleton over which skin material may be stretched to secure an aerodynamically useful structure.

2. A bilaterally symmetrical airfoil structure comprising, in combination, a vertical airfoil shaped central member, a pair of generally horizontal compression members symmetrically attached at their base to the central member near its center of gravity, and tensioned members running from the apexes of the compression members to anchor points around the perimeter of the airfoil shaped central member, said tensioned members positioning and supporting the compression members at generally right angles to the central member and diametric to each other, said tensioned members being of sufficient number and so arranged that they impart to the structure an airfoil configuration, and are interconnected one with the other to form a continuous skin element resulting in an aerodynamically useful structure.

3. An airfoil structure comprising, in combination, an airfoil shaped base member, a compression member attached at its base to the airfoil shaped base member near the center of area, and tensioned members running from the apex of the compression member to anchor points around the perimeter of the airfoil shaped base member, said tensioned members positioning and supporting the compression member at generally a right angle to the base member, said tensioned members being of sufficient number and so arranged that they impart to the structure an airfoil configuration, serving as a skeleton over which skin material may be stretched to secure an aerodynamically useful structure.

4. The subject matter of claim 3 in which the tensioned members are interconnected one with the other to form a continuous skin element resulting in an aerodynamically useful structure.

5. The subject matter of claim 1 in which the symmetrical members of said structure are so arranged that the static forces present in any symmetrical member is directly transmitted to, and countered by equal and opposite corresponding forces in the symmetrically opposite member, and the system is in equilibrium.

6. The subject matter of claim 2 in which the symmetrical members of said structure are so arranged that the static forces present in any symmetrical member is directly transmitted to, and countered by equal and opposite corresponding forces in the symmetrically opposite member, and the system is in equilibrium.

7. An airfoil structure with positive camber comprising, in combination, an airfoil shaped base member, a compression member attached at its base to the base member, and tensioned members running from anchor points at the apex of the compression member to anchor points on the base member, said anchor points arranged in such manner that an aerodynamically useful cambered airfoil configuration is circumscribed and imparted to said tensioned members and retained in any cross section.

8. The subject matter of claim 7 in which the tensioned members are interconnected one with the other to form a continuous skin element resulting in an aerodynamically useful structure.

9. An airfoil structure comprising, in combination, a base member of which a portion is airfoil shaped and has a positive camber, a compression member attached at its base to the base member, and tensioned members running from anchor points at the apex of the compression member to anchor points around the perimeter of the base member, said tensioned members contributing to the support and positioning of the compression member at a predetermined angle to the base member, said tensioned members attached to the airfoil shaped portion of the base member in sufficient number and so arranged that a cambered airfoil configuration is imparted to them, serving as a skeleton over which skin material may be stretched to secure an aerodynamically useful structure.

10. The subject matter of claim 9, in which the tensioned members forming the airfoil configuration are interconnected one with the other to form a continuous skin element resulting in an aerodynamically useful structure.

11. A bilaterally symmetrical airfoil structure comprising, in combination, a central member of which a portion is airfoil shaped, and has a positive camber, a pair of compression members symmetrically attached at their base to opposite sides of the central member, and tensioned members running from anchor points at the apexes of the compression members to anchor points around the perimeter of the central member, said tensioned members contributing to the support and positioning of the compression members at a predetermined angle to the central member and symmetrical to each other, said tensioned members attached to the airfoil shaped portion of the central member in sufficient number and so arranged that a cambered airfoil configuration is imparted to them serving as a skeleton over which skin material may be stretched to secure an erodynamically useful structure.

12. The subject matter of claim 11, in which the tensioned members forming the airfoil configuration are interconnected one with the other to form a continuous skin element resulting in an aerodynamically useful structure.

References Cited by the Examiner

UNITED STATES PATENTS 2,616,509  11/1952  Thomas _____ 244—123 X
2,986,363   5/1961  Vandegrift _____ 244—153

MILTON BUCHLER, *Primary Examiner.*

FERGUS S. MIDDLETON, *Examiner.*

A. E. CORRIGAN, *Assistant Examiner.*